(12) United States Patent
Krause et al.

(10) Patent No.: US 6,304,714 B1
(45) Date of Patent: *Oct. 16, 2001

(54) IN-HOME DIGITAL VIDEO UNIT WITH COMBINE ARCHIVAL STORAGE AND HIGH-ACCESS STORAGE

(75) Inventors: Edward A. Krause, San Diego; Jerrold Heller, Del Mar; Adam S. Tom, La Jolla; Paul Shen, San Diego, all of CA (US)

(73) Assignee: Imedia Corporation, San Francisco, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/979,145

(22) Filed: Nov. 26, 1997

Related U.S. Application Data

(63) Continuation of application No. 08/425,896, filed on Apr. 21, 1995, now abandoned.

(51) Int. Cl.[7] ....................................................... H04N 5/76
(52) U.S. Cl. ............................................. 386/52; 386/125
(58) Field of Search ............................... 386/43, 125, 126, 386/109, 112, 68, 52, 124; 348/415; 360/13; 369/83; H04N 5/76

(56) References Cited

U.S. PATENT DOCUMENTS

| | | | |
|---|---|---|---|
| 4,347,527 | * | 8/1982 | Lainez ..................................... 360/33 |
| 4,931,879 | * | 6/1990 | Koga et al. ............................ 358/335 |
| 4,989,191 | | 1/1991 | Kuo ......................................... 369/33 |
| 5,057,932 | * | 10/1991 | Lang ..................................... 358/335 |
| 5,134,499 | * | 7/1992 | Sata et al. ............................. 358/342 |
| 5,153,726 | * | 10/1992 | Billing .................................. 348/719 |
| 5,241,428 | * | 8/1993 | Goldwasser et al. ................. 386/124 |
| 5,305,102 | * | 4/1994 | Knaur et al. ........................... 348/415 |
| 5,369,339 | | 11/1994 | Reijnaerts ............................. 315/209 |
| 5,418,623 | * | 5/1995 | Park ....................................... 358/312 |
| 5,438,423 | * | 8/1995 | Lynch et al. .......................... 358/335 |
| 5,543,861 | * | 8/1996 | Harradine et al. .................... 348/718 |
| 5,555,463 | * | 9/1996 | Staron ................................... 348/718 |
| 5,754,730 | * | 5/1998 | Windrem et al. ..................... 386/124 |

FOREIGN PATENT DOCUMENTS

| | | |
|---|---|---|
| A 0 212 389 | 3/1987 | (EP) . |
| A 0 422 447 A2 | 4/1991 | (EP) . |
| 0594241A1 * | 4/1992 | (EP) . |
| 0 621 599 A2 | 10/1994 | (EP) . |
| 0 621 599 A3 | 1/1996 | (EP) . |
| WO 93/11633 | 6/1993 | (WO) . |

* cited by examiner

*Primary Examiner*—Huy Nguyen
(74) *Attorney, Agent, or Firm*—McCutchen, Doyle, Brown & Enersen, LLP

(57) ABSTRACT

An digital home video system providing recording and playback of compressed video programs using an archival storage medium; simultaneous recording and playback using the same archival medium; storage of multiple programs on a single videotape; a full array of trick mode functions; efficient management of the contents of a video tape or other archival storage medium; and real-time random access to video program content, enabling truly interactive playback. These capabilities are provided by combining the best features of an archival storage medium such as digital video tape: namely, potentially large storage capacity, but low tolerance for variable data rate, and essentially linear program access; with the complementary features of a relatively high-access storage device such as a fixed disk drive: namely, tolerance for a highly variable data rate, and random access capability, but relatively lower storage capacity.

18 Claims, 7 Drawing Sheets

IN-HOME DIGITAL VIDEO UNIT WITH COMBINE ARCHIVAL STORAGE AND HIGH-ACCESS STORAGE

This application is a Continuation of application Ser. No. 08/425,896, filed on Apr. 21, 1995 abandoned.

FIELD OF THE INVENTION

The present invention relates to in-home recording, storage, and playback of digital video program content.

BACKGROUND OF THE INVENTION

People in the United States spend roughly 7.5 billion dollars annually to rent movies and other pre-recorded video programming for private playback at their convenience. Such video programming can be distributed in several forms, such as analog video tapes (and more recently, digital video tape) for playback using a video cassette recorder ("VCR"); analog laser discs for playback on laser disc players; or digital compact discs for playback using either personal computers or else special-purpose compact disc player machines.

Present video playback systems are limited in several respects. Current systems offer relatively limited storage capacity, typically holding the equivalent of a single, feature-length movie on a single disc or tape. Digital video tape offers theoretically greater capacity, if aggressive data compression schemes are used. However, such compression has generally not been used with digital video tapes, because this greatly complicates the implementation of trick mode functions such as slow motion, fast forward, and fast and slow motion reverse.

For example, most of today's VCRs, which use helical scanning, cannot restore and playback the entire video signal if the playback speed is varied either slower or faster than normal. In addition, if the signal is highly compressed, then the loss of even a single bit could result in highly visible artifacts persisting for half a second or longer. Although it is possible to effectively implement trick modes when playing back highly compressed video signals, this requires careful selection of bits to be preserved and bits to be discarded. This type of selectivity is not possible with existing VCR technology without seriously compromising the performance of the VCR player.

Because of this inability to take advantage of high compression ratios, physical storage requirements discourage individuals from maintaining large selections of titles in their own home. Moreover, rental establishments face fierce competition among video titles for limited shelf space, and consumers are often frustrated at being unable to find a copy of the particular titles they seek. A related problem is that current systems cannot conveniently access multiple programs within a user' library, since each program typically resides on a physically separate disc or tape. Therefore, each time a different title or program is desired, the user must physically locate and load the desired tape or disc. In addition, if the selected tape contains more than one program, then the user may also need to search through the tape to find the beginning of the desired program. Clearly, an improved storage and distribution scheme for video programming is desirable.

Recording video programs in the home presents further problems for current technologies. Many people use VCRs to record broadcast or cable presentations for later viewing, in essence "time shifting" a program for perusal at their convenience. Similarly, viewers may watch one broadcast or cable program while simultaneously recording another for later viewing. Read-only discs (such as compact discs and laser discs) are inherently unsuitable for such recording. Consumer VCRs therefore utilize magnetic tape, typically in analog VHS format, and more recently in digital format. However, VCR technology still exhibits important limitations. For example, present videotape recording systems, whether for digital or analog tape, do not support real-time random access; instead, real-time recording and playback proceed in strictly linear fashion.

Moreover, current VCRs do not provide simultaneous, independent read and write access. In other words, a user cannot view a taped program while simultaneously recording another program onto the same tape. For example, if a user wishes to record for later viewing a broadcast or cable presentation using a VCR, the user cannot use the same VCR to enjoy a different movie on tape while the broadcast is being taped. As another example, if a user sets her VCR to record a two-hour television movie starting at 8:00 p.m., and returns home at 8:30 p.m., she cannot simply sit down and watch the movie from its beginning, because her VCR is still occupied recording the broadcast. Consequently, the viewer must either wait until the broadcast ends at 10:00 p.m. (at which point she may be too tired to begin watching a two-hour movie), or else watch the movie out of order, i.e., watch the actual telecast from 8:30 until 10:00 p.m., and replay the taped version of the first half hour afterwards. Neither choice is satisfactory, and an improved VCR with simultaneous read/write capability is therefore desirable.

An additional problem posed by present technology involves managing storage space on tapes containing more than one program. For example, if a user decides to delete one program and store another, one of two situations may exist. If the deleted program is longer than the new program, the new program can be stored in the same "space" on the tape. However, some leftover space exists that is not large enough to store an entire program, and is probably not contiguous with other available space. Thus, it is likely that this amount of storage capacity will be wasted. If, on the other hand, the new program is longer than the deleted program, the new program cannot be stored in its entirety, unless a portion can be stored in non-contiguous space elsewhere on the tape. Consequently, there is a need in the art for an efficient storage management scheme, whereby video programs can be stored, deleted, and accessed with little or no wasted tape storage.

The above discussion demonstrates the need for an improved home video system that supports recording and playback of compressed video programs using an archival storage medium; allows simultaneous recording and playback using the same archival medium; provides efficient storage of multiple programs on a single videotape; supports a full array of trick mode functions; efficiently manages the contents of a video tape or other archival storage medium; and supports real-time random access to video program content, enabling truly interactive playback. As used herein, "video program" data refers to video data and/or audio data.

SUMMARY OF THE INVENTION

The present invention addresses the foregoing objectives by methods and apparatus that combine the features of an archival storage medium such as digital video tape: namely, potentially large storage capacity, but low tolerance for variable data rate, and essentially linear program access; with the complementary features of a relatively high-access storage device such as a fixed disk drive: namely, tolerance for a highly variable data rate, and random access capability, but relatively lower storage capacity.

In accordance with the present invention, video program data in compressed form is read from the archival medium, which may contain several feature-length movies or other video programs, and transferred to the high-access medium in segments. This transfer occurs at a rate faster than real-time, where "real-time" is defined as normal presentation speed of the video program (e.g. several minutes of program data may be transferred in a matter of seconds). Each segment to be transferred may contain, for example, a fixed amount of data corresponding to an average of one half hour of program content, as determined by the compression ratio which may vary over time. This data may then be read from the high-access medium and presented to the viewer. Enough program data is temporarily stored on the high-access medium for the viewer to be able to fast forward or rewind through the program, or to instantly jump to other destinations within an interactive video program, so long as those destination points lie within the segments currently stored in the high-access medium.

At the same time, simultaneous recording of another televised program to the same archival medium can be performed. A televised signal, or a signal from any other outside source, is compressed and written to the high-access medium. Periodically, this data is transferred from the high-access medium to the archival medium. Thus, the high-access medium acts as a two-way buffer, retrieving data from and storing it to the archival medium in a manner that is transparent to the user.

The relatively large capacity of the high-access medium and its ability to act as a buffer can also be used to permit dubbing and editing from one tape to another. A user can to load a substantial amount of program content from one tape to the high-access medium, change tapes, and then transfer the program data from the high-access medium to the new tape.

In a further aspect of the invention, program data need not be stored sequentially on the archival medium. For instance, the end of a movie might be physically located before the beginning on a digital videotape. A table mapping the various segments on the tape to the corresponding video programs or program segments is used to allow continuous presentation of the program to the viewer. Thus, a technique is disclosed including steps for partitioning the digital videotape into a plurality of segments of fixed and equal length, maintaining a list of the programs contained on the tape which is associated with a second list that specifies the segment or segments containing the compressed data associated with the program, and maintaining or periodically generating a list of "free" segments that have not been allocated to a particular video program.

DETAILED DESCRIPTION OF THE INVENTION

Figure 1:
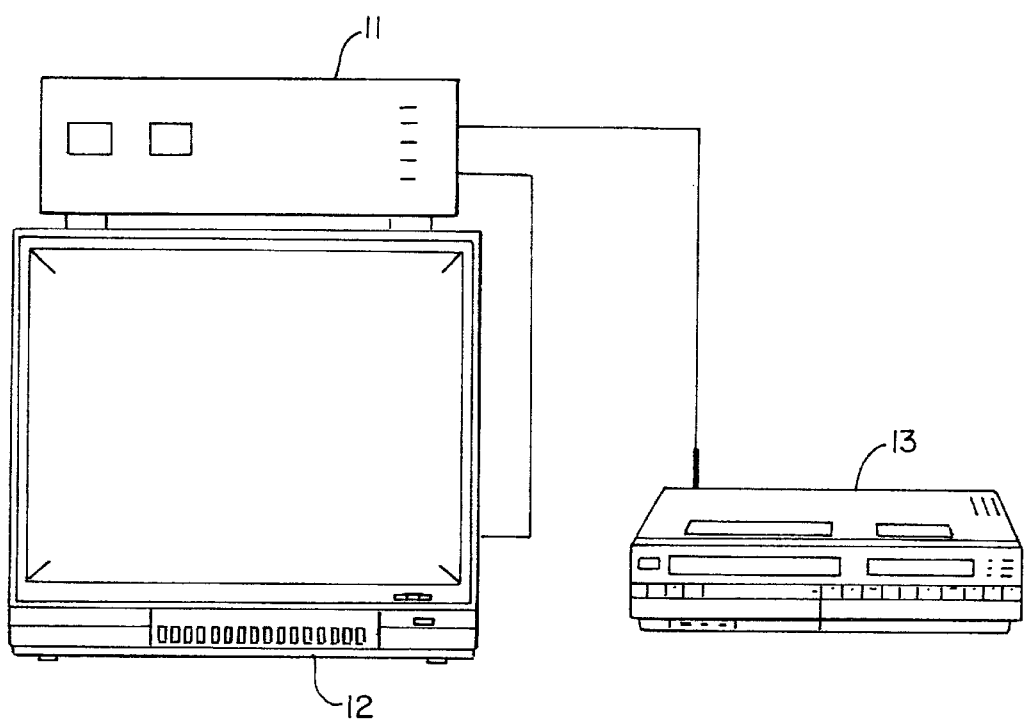
FIG. 1 illustrates a "set-top" box connected to a television and videotape recorder.

The present invention involves a unique application of data control and management principles that allows a user to record video information in highly compressed form to an archival storage medium such as a digital video tape ("DVT"); to play video programs stored in compressed form from such archival storage medium; or to simultaneously record to such archival medium while viewing information or interacting with a program from the same archival medium. In the preferred embodiment, the invention utilizes the technique of variable bit rate ("VBR") encoding and decoding of video data (including soundtrack or audio data, and using a compression algorithm such as MPEG) to reduce the total amount of storage needed both on the archival medium and on a high-access storage device such as a hard disk that acts, in essence, as a two-way, first-in-first-out ("FIFO") buffer, passing data from the archival storage medium to the viewer, from an input source, such as a broadcast or cable television signal, to the archival medium, or both simultaneously.

The following detailed description is made with reference to FIGS. 1–7, in which like reference numerals indicate identical elements throughout all of the Figures.

A video program is typically organized as an ordered sequence of scenes or frames, with each frame defined by a two-dimensional array of picture elements or pixels. A pixel has characteristics of color and intensity of illumination that, when combined with other pixels, create an image or frame. For a given frame, the characteristics of each pixel can be represented digitally. Thus, a video program can be converted into a digital data stream that is an ordered sequence of bits which describes pixel values for each pixel of the array during each frame of the video program. Audio associated with the program can also be converted into digital data, and can be synchronously combined with the video.

Once digitized, video data can be stored in compressed form. Thus, instead of representing each pixel within a frame by a set number of bits so that each frame requires the same amount of data storage, certain frames which contain uniform attributes, such as color or brightness, may be represented by fewer bits (i.e. less data) than other frames. In the same manner that pixels within a frame may be compared, frames within a sequence may be compared to reduce the total number of bits required to store a given sequence. A consequence of this type of data compression is that the number of bits required to store a single frame or sequence of frames is not constant.

Because most transmission channels or storage devices have a fixed bandwidth, and can only support a limited data rate, buffer devices and control feedback mechanisms are typically used to even out the compression data rate so that it becomes limited over a period of time to the maximum value that can be supported. Unfortunately, this reduces compression efficiency, either by delivering unnecessarily high picture quality when a scene is easily compressed or by introducing compression artifacts when a scene is more difficult to compress, given the limited bandwidth that is available. The high-access storage device of the present invention avoids the need for such buffers and control feedback mechanisms, and permits the use of true variable bit rate ("VBR") compression schemes. This type of encoding is possible using, for example, the MPEG video compression standard.

A prior art VCR cannot properly access and display VBR data. The reason for this is a mechanical limitation. VCR motors are generally designed to move tape past a read head at a constant number of feet per second. The motors used in these types of systems are incapable of adjusting to a VBR data stream, which would, for instance, require a tape to be played at a continuously varying speed, where the speed required was a function of the amount of compression achieved within each frame or sequence of frames. An alternative technique of stopping and restarting the tape would be effective in accommodating VBR streams, but would be expensive and inefficient to implement, and would seriously compromise the reliability of both helical and linear scan tape transport mechanisms that can be produced with current technology.

A "high-access" medium, such as a disk drive like those used in many computer systems, is capable of handling variable data rates. Presently, however, the storage disks used in such drives are generally incapable of storing more than one to two hours of video data.

Thus, a major limitation in the prior art is that it is impractical to store highly compressed video data on an archival medium such as video tape because playback devices for these media cannot easily adjust to the variable data rate required for VBR encoding or trick mode display functions such as slow motion, fast search, or reverse play. High-access media, while allowing variable-speed playback and recording of compressed data, have the limitation that they generally cannot hold the large quantity of information, in excess of one feature length film, that archival media can contain.

To overcome the shortfalls discussed above, the present invention uses the unique control/management architecture detailed below, which combines the best features of both archival and high-access storage media.

In addition, the present invention provides the ability to handle data from two sources, output from an archival medium and input from an external source such as a broadcast or cable signal, to provide the user with the ability to play and record using the same archival medium, e.g. a DVT, simultaneously.

Overall Architecture

Figure 2:
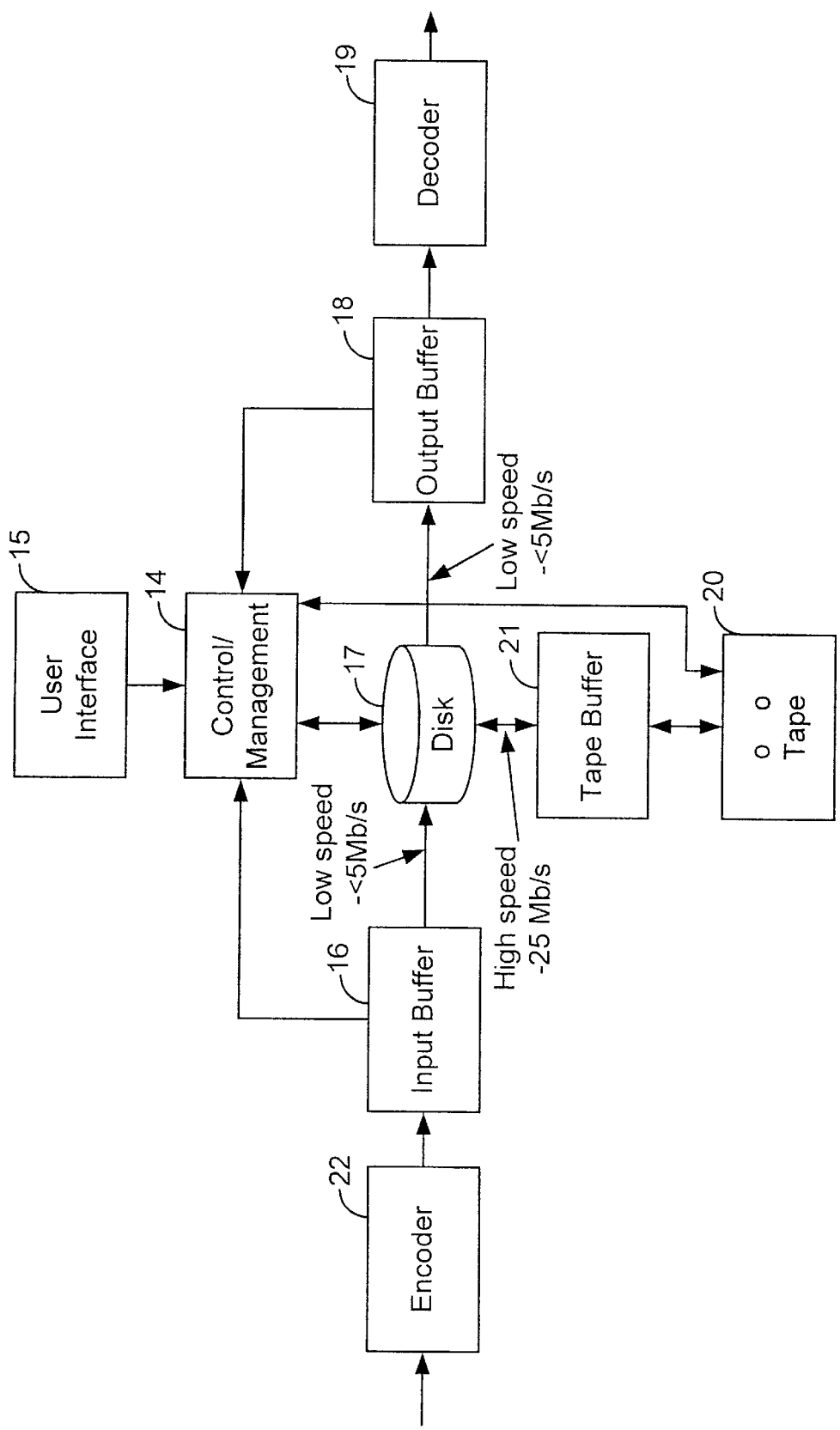
FIG. 2 illustrates the high-level architecture of the present invention.

FIG. 2 illustrates the general, high level architecture of the present invention. In the embodiment illustrated, the present invention is integrated into a single "set-top box," 11 so-called because it is a physically separate box that is coupled to a viewer's television 12 and VCR 13 (as illustrated in FIG. 1), although the invention could incorporate the VCR 13 itself, eliminating the need for another box. As shown in FIG. 2, the set-top box contains a control/management device 14 coupled to a user interface 15. The user interface 15 may be a remote control, through which a user may issue commands such as play, stop, record, or trick-mode function commands such as search, fast forward and the like. If an interactive program is being viewed, the viewer would use the interface to respond to prompts in the program, and his or her responses would direct the control/management device 14 to access a different portion of the program.

The control/management device 14 also receives status information from an input buffer 16, which provides temporary storage for incoming signals, possibly encoded and encrypted, such as broadcast or cable data streams. The input buffer 16 signals to the control/management device 14 when it has achieved a certain level of fullness, so that its contents may be written to the disk 17 at the direction of the control/management device 14. The control/management device 14 also receives updates from an output buffer 18 which tells the control/management device 14 when it achieves a certain state of "emptiness" and is ready to receive more data from the disk 17. The output buffer 18 also sends data to the television set 12 or monitor after decoding at the direction of the control/management device 14. The decoder 19 can be preceded by a data decryption unit if access control is in use.

The control/management device 14 also sends and receives signals from the archival storage medium 20, in the preferred embodiment a digital video tape, monitoring and commanding tape position based on the current status of information stored on the high access storage device 17, in the preferred embodiment a hard disk, and on user commands issued through the user interface 15. Finally, the control/management device 14 communicates with the high-access storage device 17, directing it to accept data from the input buffer 16 or from the archival storage medium 20 via a buffer, or to transfer data to the output buffer 18, or the archival storage medium 20, and indicating which segments are to be read from or written to.

Since currently available high-access storage devices are able to support only one transfer at a time, all of the transferring steps performed by the control/management device 14 are typically prioritized and interleaved. All of the transfers would be sequenced to insure that the necessary amount of program data is available for display to the user, while at the same time, the input and output buffers (16 and 18) are kept at required levels of fullness (or emptiness). In addition, the interleaved transfers are accomplished at a rate faster than "real time," i.e. faster than the normal presentation rate of the video data.

Alternatively, if the high-access storage device 17 is capable of supporting multiple, simultaneous transfers, then only the transfer to/from the archival medium 20 would need to be interleaved and performed at a rate faster than real time. The transfers from the input source to the high-access storage device 17 and from the high-access storage device 17 to the decoder 19 and display apparatus could in principle be performed in real time and without the need for input and output buffers.

Figure 3A:
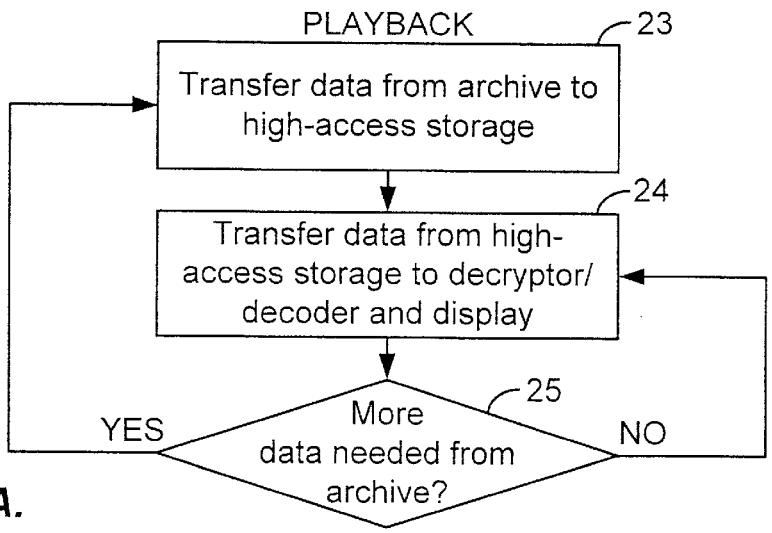
FIGS. 3a and 3b illustrate a high-level process and flow of video playback and recording in accordance with the present invention.
Figure 3B:
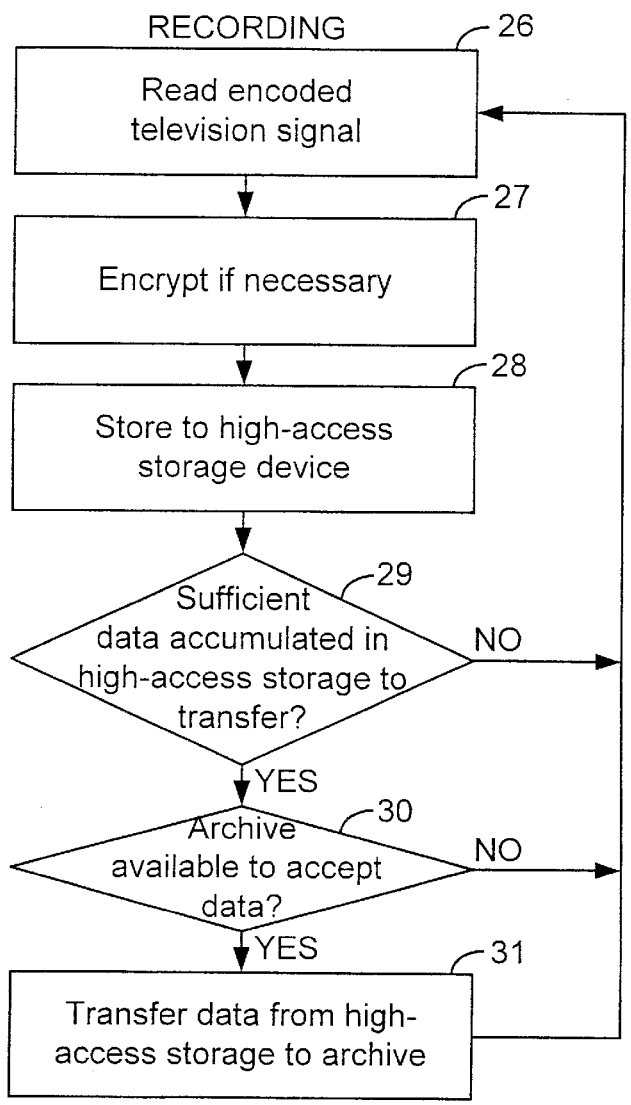

FIGS. 3a and 3b illustrate the overall processes for storage, retrieval, playback, and recording in accordance with the present invention. FIG. 3a illustrates the process of playing a video program stored on the archival medium 20. Data is first transferred to the high-access medium 17, then decoded and displayed to the viewer (steps represented by elements 23 and 24). The process is repeated as necessary so that a sufficient amount of video data, both ahead of and behind the portion of the program currently being displayed, is available on the high-access storage device 17 (step represented by element 25).

FIG. 3b illustrates the recording process of the present invention. As shown, a televised signal is encoded and stored in a temporary buffer, encrypted if necessary and desired, and then stored to the high-access medium 17 (steps represented by elements 26, 27, and 28). If sufficient data has accumulated in high-access storage, and if the archival storage medium 20 is then available, the data is then transferred to the archival medium 20 (steps represented by elements 29, 30 and 31). This process is repeated until the entire televised program has been recorded on the archival medium 20.

The processes illustrated in FIGS. 3a and 3b are not always independent. Rather, during simultaneous recording and playback, access to the high-access storage device for reading or writing is prioritized such that there is always sufficient program data available for display and sufficient space in the buffer 16 containing data from the televised signal to prevent overflow (and thus, the possibility that a portion of the televised program will not be stored).

Figure 4:
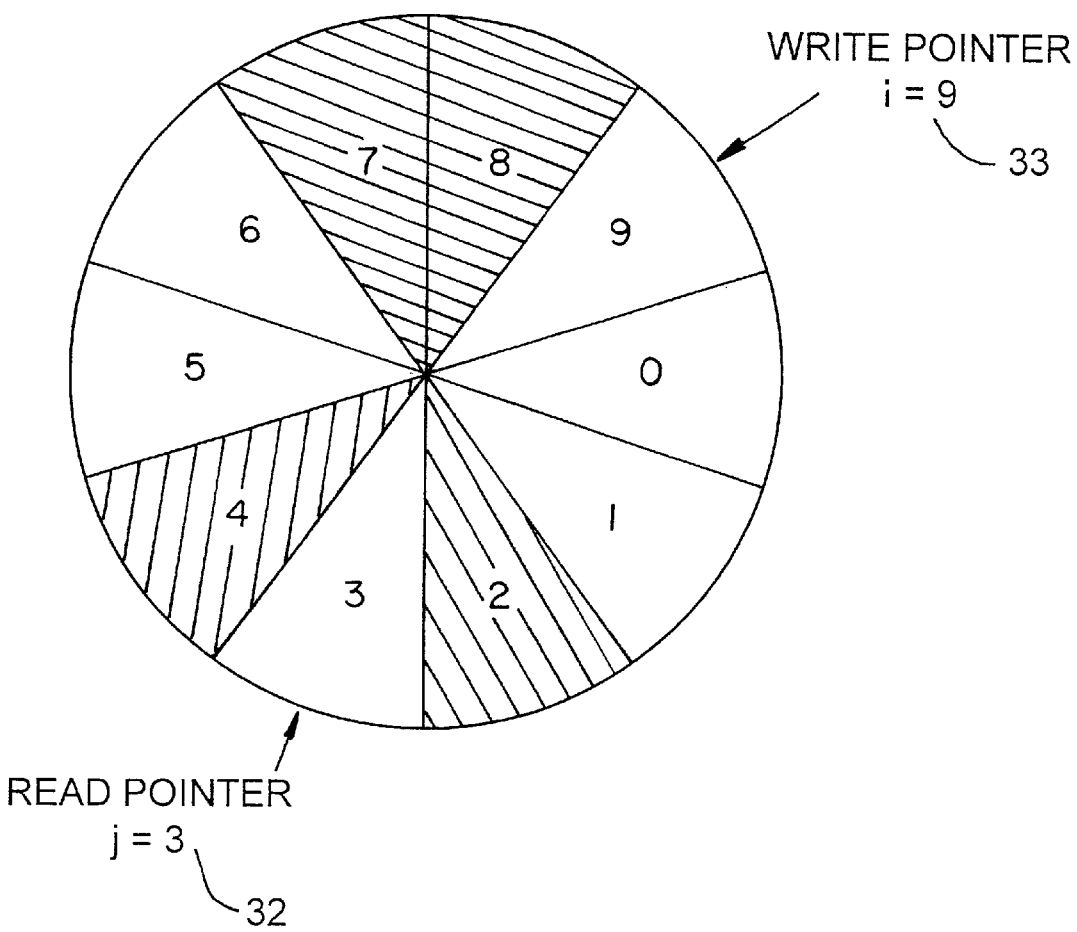
FIG. 4 illustrates a high-access data storage medium sub-divided into ten segments.

FIG. 4 illustrates a high-access storage device divided into ten segments. The number of segments may be varied depending on disk capacity and the desired amount of data to be stored in each segment. As illustrated by FIG. 4 (for purposes of simplicity and explanation), data is stored to the disk in a clockwise direction. Data is read from the disk in a clockwise direction for forward playback, counter-clockwise for reverse playback. The current segment being written to is designated by a write pointer 33, designated "i" in the illustration. The current disk segment being read from is designated by a read pointer 32, designated "j" in the illustration. Next and previous read segments are designated by "j+1" and "j−1" respectively.

Each disk segment is mapped to a corresponding tape segment. Thus, tape segment "m" corresponds to disk segment "j", and tape segment "n" corresponds to disk segment "i". Each disk or tape segment can contain a set amount of compressed video data. On the tape medium, each segment would consist of a physically contiguous portion of the tape. A segment on the disk, however, may actually consist of several physically separate spaces on the magnetic medium, in other words, one chronological portion of the video data (as seen when played back in real time), although designated as one "segment" need not be stored in one place on the disk. For purposes of this illustration, it is assumed that each segment contains, on average, one half hour of program data. So, for example, the information in tape segment "m" would be copied to disk segment "j" (and retained for some time) as necessary to maintain enough video information on the disk for the user to be able to view, fast forward, or rewind through a program. As discussed previously, accessing information from the disk 17, rather than directly from the DVT 20, allows the viewer to take advantage of the high-access medium 17 to jump in near real time from one part of a program to another. Similarly, data collected on the disk 17 from an outside source (such as broadcast or cable) through the input buffer 16 and stored in segment "i" of the disk would be written to tape segment "n" at the direction of the control/management device 14.

Thus, through the procedures detailed below, the control/management device 14 handles data transfer between outside source, display 12, tape 20, and disk 17 such that the user may view a taped program, via tape segments stored to disk, while the same tape is recording information from the outside source, again through data previously stored to segments of the high-access storage device.

EXAMPLE

Simultaneous Tape Playback and Recording

Referring again to FIG. 4, the read pointer 32 is currently in segment no. 3 (i.e. j=3). Data from this segment is currently being decoded and displayed to the viewer. Segment no. 4 contains the next half hour of programming information, while segment no. 2 contains the previous half hour. If the viewer desires to watch the program at normal speed, the read pointer 32 will rotate clockwise, next pointing to segment no. 4. Eventually, older data, such as that in segment no. 2, will be overwritten with new information. However, if the viewer wishes to "rewind" to an earlier portion of the program, the read pointer 32 will rotate counter-clockwise to segment no. 2. If he or she wishes to "fast forward" the read pointer 22 will rotate clockwise at a higher speed than during normal playback. In fact, the speed of read pointer 32 rotation is proportional to the commanded playback speed.

At the same time, the write pointer 33 is currently in segment no. 9. After this segment becomes completely filled with data from the input buffer 6, a new segment, in the preferred embodiment, the available segment farthest away from the read pointer 32 (as shown in the flow chart of FIG. 6 detailing the input interrupt function, discussed later), will be selected. In this example, segment nos. 7 and 8 have been completely filled, but have not yet been transferred to tape. Segment nos. 0, 1, 5, and 6 are free segments that have not yet been allocated for reading or writing.

Two variables are defined to indicate the status of each disk segment, where the segment number is equal to "k". Variable "rd_list[]" indicates whether segment k contains valid data for reading. If segment k does contain valid data, variable rd_list[k]=1. Otherwise, rd_list[k]=0. The management/control program uses this value to determine where to write the next tape segment to the disk. Through logic described in the flowchart of FIG. 6, data is written to the free segment that is physically farthest from the current segment being read (steps represented by elements 50–53).

Variable "wr-list[k]" indicates the status of each segment for writing. If segment k is not currently in use for writing (i.e. it is not currently being written to, and is not full and waiting to have the data stored therein transferred to tape), then wr_list[k]=−1. If k=i, in this example 9, then wr_list[k] is set to the full disk segment that contains the oldest data that has not been transferred to tape. Thus, in the present example, wr_list[9]=7, and segment 7 is the next segment whose data will be transferred to tape. The following table shows, for this example, the values of these two variable for each segment of the disk.

TABLE I

| Segment No. [k] | rd_list[k] | wr_list[k] |
|---|---|---|
| 0 | 0 | −1 |
| 1 | 0 | −1 |
| 2 | 1 | −1 |
| 3 | 1 | −1 |
| 4 | 1 | −1 |
| 5 | 0 | −1 |
| 6 | 0 | −1 |
| 7 | 0 | 8 |
| 8 | 0 | 9 |
| 9 | 0 | 7 |

After segment 7 has been transferred, the next segment to be transferred (the next oldest full segment) is wr_list[wr_list[i]] (in this example, 8), followed by wr_list[wr_list[wr_list[i]]]. This iterative process continues until the result equals i, in this example 9, which cannot yet be transferred because it is not yet full. After each segment is transferred it is released by setting the wr_list value for that particular segment to −1.

Figure 5:
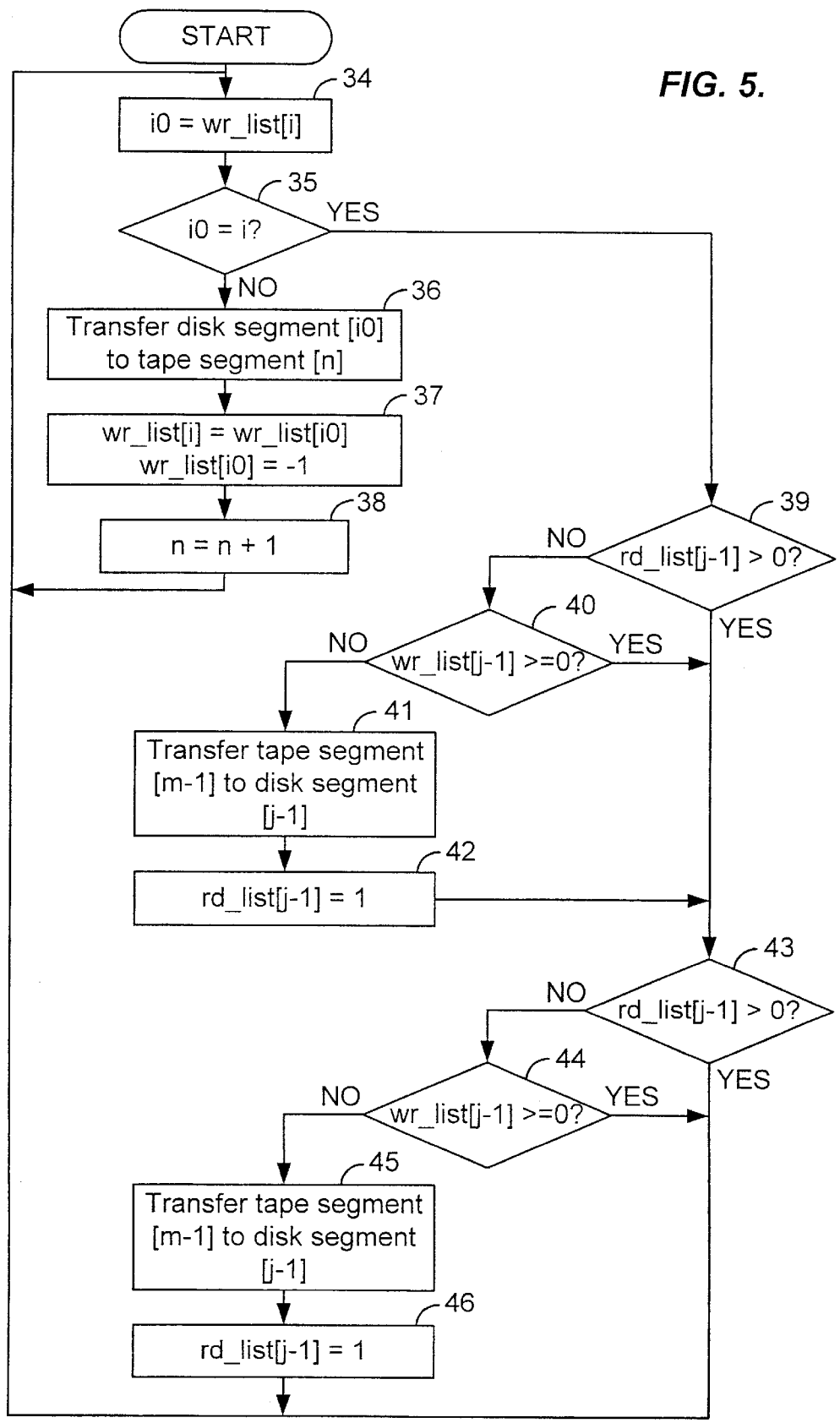
FIG. 5 illustrates the logic used in transferring data between the archival storage medium and the high-access storage device.

The entire process for transferring data between tape 20 and disk 17 is detailed in the flowchart of FIG. 5. After setting initial values, the first decision point 35 is reached. It is determined at this time whether there are any full disk segments that need to be written to tape. If there are (i.e. if, in FIG. 5, "i0" is not equal to "i"), then the process of the present invention transfers the oldest full segment, updates the value of wr_list[i], and sets wr_list for the segment that has just been transferred to –1 (indicating that this segment is now available) (steps represented by elements 36 and 37). This loop (represented by elements 24–28) is repeated until all full segments have been transferred to tape.

At this point, the process of the present invention checks the status of data on the high-access medium available for output to the viewer. If the segments both behind and ahead of the read pointer 32 are loaded with data from the corresponding tape segments, i.e. if there is sufficient program information on the disk so that the viewer may fast forward and rewind to "adjacent" portions of the presentation, then the process returns to the write loop (elements 39 and 43). If either the segment before or after the segment currently being read does not contain valid data for reading, then the process finds an available disk segment and transfers the appropriate tape segment (steps represented by elements 39–46).

Figure 6:
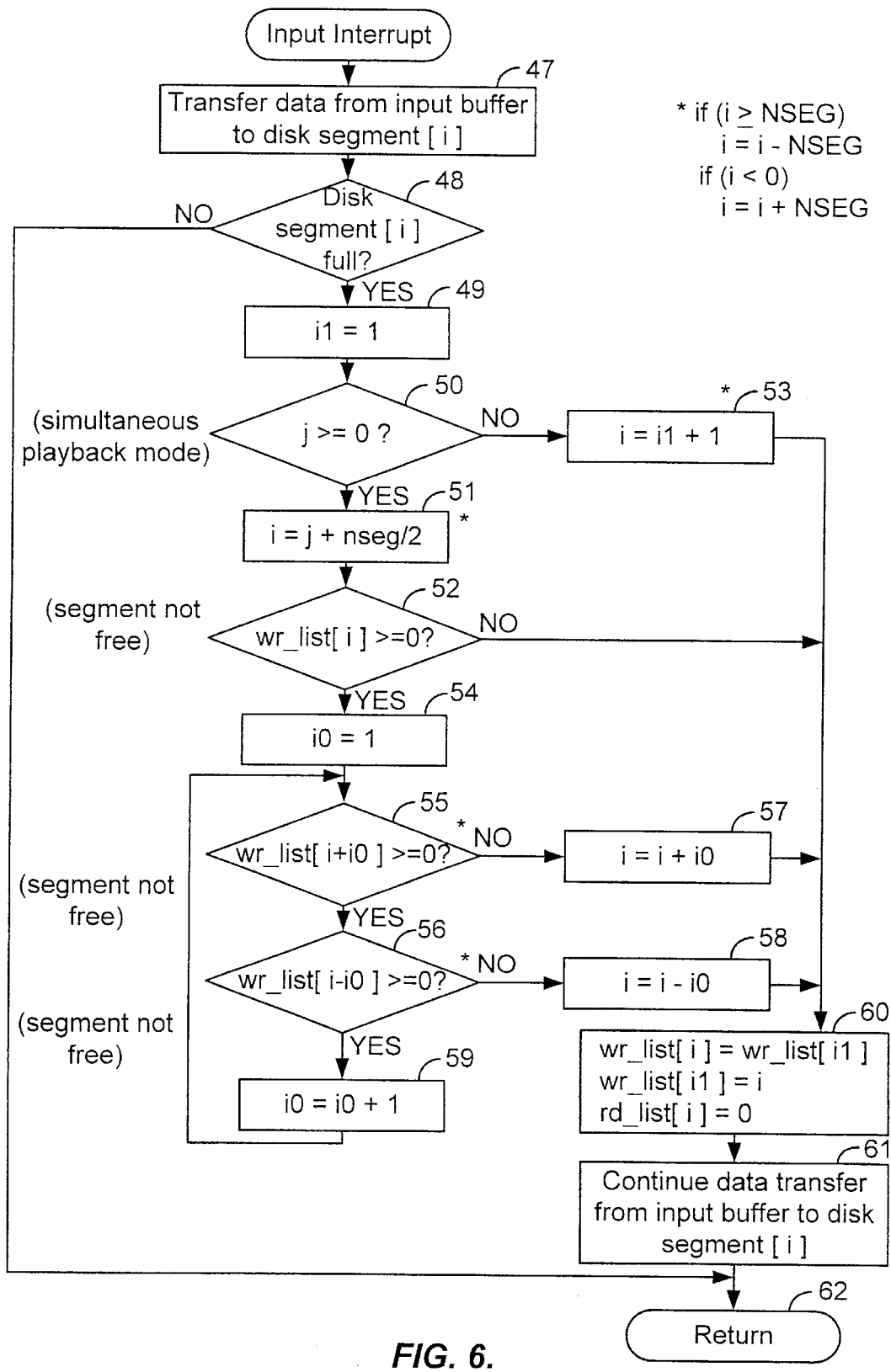
FIG. 6 illustrates the Input Interrupt logic.
Figure 7:
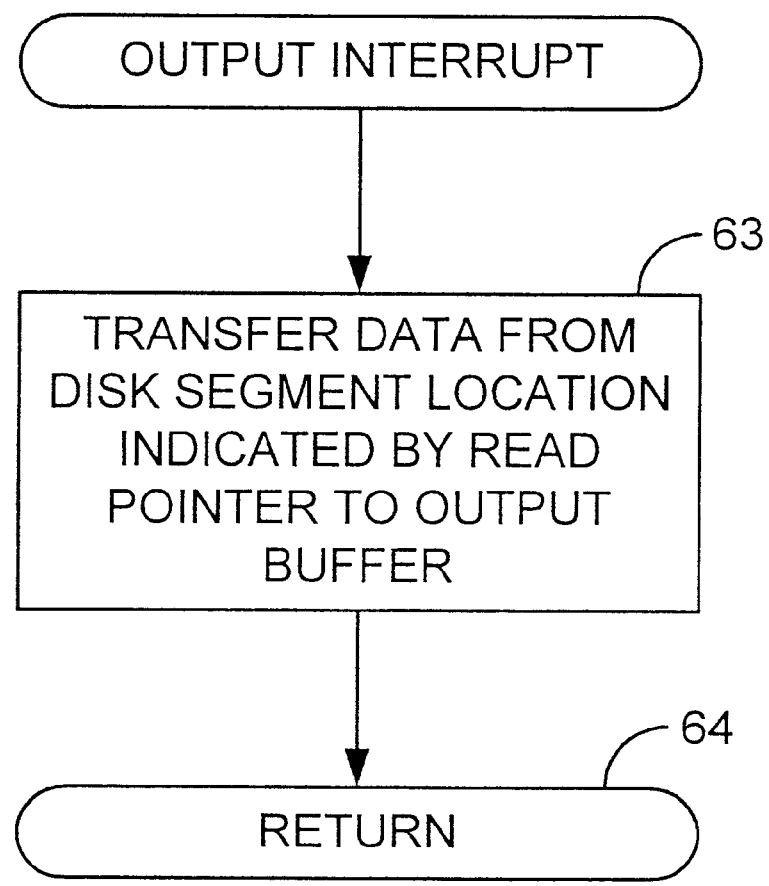
FIG. 7 illustrates the Output Interrupt logic.

This main process may be interrupted by the Input Interrupt function detailed in the flowchart of FIG. 6, or the Output Interrupt function detailed in the flowchart of FIG. 7. The Input Interrupt is triggered when the input buffer 16 achieves a certain level of fullness, indicating that data must be removed and transferred to disk to prevent the input buffer 6 from overflowing. Each interrupt causes a block of data to be sequentially written to disk segment "i," (element 47) and this process continues until disk segment "i" becomes full. A new segment is then selected from the list of available segments, and the write pointer 33 is placed at the beginning of that segment. If simultaneous playback is not in progress, then this new segment can be determined simply by incrementing the value of "i" (elements 50 and 53). During simultaneous recording and playback, the process of the present invention places the write pointer 33 as far from the current position of the read pointer 32 as possible (setting i=j+(number of segments)/2), and then finds the nearest free segment and designates it for writing (elements 50–60). Data is then transferred from the input buffer 16 to the beginning of the designated disk segment.

Likewise, an Output Interrupt is triggered when the output buffer 18 achieves a certain level of emptiness, and is, thus, ready to receive more program information. Data is then transferred from the segment indicated by the current position of the read pointer 32 to the output buffer 18 (step represented by element 63). In the preferred embodiment of the invention, the Output Interrupt would have a lower priority than the Input Interrupt to prevent the input buffer from overflowing.

The frequency of the output interrupts will vary depending on the playback speed selected by the user. For example, during pause or slow motion, video data will be removed from the output buffer 18 at a slower than normal rate, and therefore fewer transfers from the disk will be needed to maintain the output buffer 18 at the desired level of fullness.

Similarly, during fast forward or reverse searches, the decoder 19 will remove video data from the output buffer 18 at a higher rate, thereby requiring more frequent transfer from the disk 17 in order to prevent the output buffer 18 from underflowing. At certain fast forward or reverse playback speeds, the decoder 19 may be unable to process all the data that is available, and in these cases, the decoder 19 can be instructed by the control/management unit 14 to omit certain selected frames, or alternatively, additional devices can be inserted after the disk 17 and before the decoder 19 (preferably between the disk 17 and the output buffer 18) in order to delete the selected frames from the data stream.

It is possible that the disk throughput may be insufficient to simultaneously service the input, output, and tape buffers when high playback speeds are demanded by the user. In such cases, the control/management unit 14 can instruct the disk to skip over certain sections of the data stream when transferring date to the output buffer 18. Ideally, the sections that are omitted would be the frames that are not decoded and displayed. In practice, accurate specification of these boundaries may be difficult without compromising disk drive performance.

In the discussion above, it has been assumed for convenience that the tape segments referenced by subscripts "m" and "n" were sequential, i.e. that a video program is stored on tape in chronological order. In practice, and in the preferred embodiment, these segments can be stored in random order by maintaining a directory which maps the chronological segment number to an actual sequence number on the DVT 20. In this manner, the tape 20 is used more efficiently, because certain randomly distributed "free" segments may be allocated as needed until the tape 20 is full. In other words, it would be less efficient if each program, perhaps a two hour film, had to be stored in one block of magnetic memory. Fewer features would fit on one tape, particularly as some programs were overwritten by new information not of identical length.

The discussion above demonstrates several advantages of the present invention. First, it allows the user to simultaneously playback from and record to the same high capacity storage medium such as a digital video tape. Thus, a viewer may watch a program stored on tape while recording another, or may time shift a program he or she is presently recording by less than the entire program time. In addition, the present invention allows a user to archive and easily access and manage an entire library of programs on a single video tape.

Other Variations

Other embodiments and modifications within the spirit of the present invention will occur to those of ordinary skill in the art in view of these teachings, including further variations on, and alternatives to, the illustrative processes that have been disclosed herein, Such embodiments and algorithms remain within the scope of the present invention, which is limited only by the following claims.

We claim:

1. A method for simultaneously recording first digital program data onto a high-capacity archival medium partitioned into segments and playing back second digital program data from the same high-capacity archival medium, said method utilizing a high-access storage device partitioned into segments, an input buffer, and an output buffer, and comprising the following steps:

writing the first program data into the input buffer;

selecting a first current segment of the high-access storage device for writing the first program data;

transferring the first program data from the input buffer to the first current segment of the high-access storage device;

selecting a second current segment of the high-access storage device for reading the first program data;

selecting a first current segment of the high-capacity archival medium for writing the first program data;

transferring the first program data from the second current segment of the high-access storage device to the first current segment of the high-capacity archival medium;

selecting a second current segment of the high-capacity archival medium for reading the second program data;

selecting a third current segment of the high-access storage device for writing the second program data;

transferring the second program data from the second current segment of the high-capacity archival medium to the third current segment of the high-access storage device;

selecting a fourth current segment of the high-access storage device for reading the second program data;

transferring the second program data from the fourth current segment of the high-access storage device to the output buffer;

maintaining the level of fullness of the input and output buffers to prevent said input and output buffers from underflowing or overflowing;

interleaving the transfer of the first program data from the input buffer to the first current segment of the high-access storage device, the transfer of the first program data from the second current segment of the high-access storage device to the first current segment of the high-capacity archival medium, the transfer of the second program data from the second current segment of the high-capacity archival medium to the third current segment of the high-access storage device, and the transfer of the second program data from the fourth current segment of the high-access storage device to the output buffer; and reading the second program data from the output buffer, wherein the transfer of the first program data from the input buffer to the first current segment of the high-access storage device, the transfer of the first program data from the second current segment of the high-access storage device to the first current segment of the high-capacity archival medium, the transfer of the second program data from the second current segment of the high-capacity archival medium to the third current segment of the high-access storage device, and the transfer of the second program data from the fourth current segment of the high-access storage device to the output buffer appear simultaneous.

2. The method of claim 1, wherein the segments of the high-access storage device are of lengths enabling the use of trick modes.

3. The method of claim 1, wherein the first program data and the second program data are identical.

4. The method of claim 1, wherein the first program data and the second program data are different.

5. The method of claim 1, wherein all segments of the high-access storage device are identical in size.

6. The method of claim 1, wherein all segments of the high-capacity archival medium are identical in size.

7. The method of claim 1, wherein the high-access storage device comprises a hard disk drive, and the high-capacity archival medium comprises digital video tape.

8. The method of claim 1, wherein the high-access storage device comprises electronic memory, and the high-capacity archival medium comprises a hard disk drive.

9. The method of claim 1, wherein said first and second digital program data are compressed.

10. An apparatus for simultaneously recording first digital program data onto a high-capacity archival medium partitioned into segments and playing back second digital program data from the same high-capacity archival medium, comprising:

an input buffer;

an output buffer;

a high-access storage device partitioned into segments;

means for receiving the first program data and storing the received first program data into the input buffer;

means for selecting a first current segment of the high-access storage device for writing the first program data;

means for transferring the first program data from the input buffer to the first current segment of the high-access storage device;

means for selecting a second current segment of the high-access storage device for reading the first program data;

means for selecting a first current segment of the high-capacity archival medium for writing the first program data;

means for transferring the first program data from the second current segment of the high-access storage device to the first current segment of the high-capacity archival medium;

means for selecting a second current segment of the high-capacity archival medium for reading the second program data;

means for selecting a third current segment of the high-access storage device for writing the second program data;

means for transferring the second program data from the second current segment of the high-capacity archival medium to the third current segment of the high-access storage device;

means for selecting a fourth current segment of the high-access storage device for reading the second program data;

means for transferring the second program data from the fourth current segment of the high-access storage device to the output buffer;

means for maintaining the level of fullness of the input and output buffers to prevent said input and output buffers from underflowing or overflowing;

means for interleaving the transfer of the first program data from the input buffer to the first current segment of the high-access storage device, the transfer of the first program data from the second current segment of the high-access storage device to the first current segment of the high-capacity archival medium, the transfer of the second program data from the second current segment of the high-capacity archival medium to the third current segment of the high-access storage device, and the transfer of the second program data from the fourth current segment of the high-access storage device to the output buffer; and means for reading the second program data from the output buffer, wherein the transfer of the first program data from the input buffer to the first current segment of the high-access storage device, the transfer of the first program data from the second current segment of the high-access storage device to the first current segment of the high-capacity archival medium, the transfer of the second program data from the second current segment of the high-capacity archival medium to the third current segment of the high-access storage device, and the transfer of the second program data from the fourth current segment of the high-access storage device to the output buffer appear simultaneous.

11. The apparatus of claim 10, wherein the segments of the high-access storage device are of lengths enabling the use of trick modes.

12. The apparatus of claim 10, wherein the first program data and the second program data are identical.

13. The apparatus of claim 10, wherein the first program data and the second program data are different.

14. The apparatus of claim 10, wherein all segments of the high-access storage device are identical in size.

15. The apparatus of claim 10, wherein all segments of the high-capacity archival medium are identical in size.

16. The apparatus of claim 10, wherein the high-access storage device comprises a hard disk drive, and the high-capacity archival medium comprises digital video tape.

17. The apparatus of claim 10, wherein the high-access storage device comprises electronic memory, and the high-capacity archival medium comprises a hard disk drive.

18. The apparatus of claim 10, wherein said first and second digital program data are compressed.

* * * * *